Patented Aug. 7, 1923.

1,464,036

UNITED STATES PATENT OFFICE.

WILLIAM F. GORDON AND EDWARD W. KEITH, OF DENVER, COLORADO.

HYDROMETALLURGICAL PROCESS OF ORE TREATMENT.

No Drawing.   Application filed September 12, 1921.   Serial No. 500,196.

*To all whom it may concern:*

Be it known that we, WILLIAM F. GORDON and EDWARD W. KEITH, citizens of the United States of America, residing at the city and county of Denver and State of Colorado, have invented a new and useful Hydrometallurgical Process of Ore Treatment, of which the following is a specification.

Our invention relates to a new hydrometallurgical process of ore treatment, and our process consists of a method of treating ores and other mineral bearing compounds, and recovering the minerals contained in a concentrated condition of individual elements and groups of elements, by the application of a solvent solution heretofore unrecognized and unknown to science or to the hydrometallurgical industry.

The liquid herein used as the solvent solution is of low commercial value and obtainable in reasonable quantity in most manufacturing districts and countries. It is applied in its raw state as produced, therefore avoiding any expensive preliminary refining or elimination of deleterious elements. Although in first application as a solvent of mineral elements contained in ores and other mineral compounds, the solution passes through a distillation process which is automatic in recovering both the solvent ingredients contained and causing the precipitation of the soluble mineral elements contained. The recovered solvent chemical ingredients of a distillate nature are recombined with fresh solution or spent liquor, reestablishing thereby its original strength in solvency required for re-use or re-application of the menstruum in the process.

The menstruum or solution used contains ingredients in combination or is a combination of ingredients, or is in itself of a solvent nature, active in dissolving and taking into solution certain metallic mineral elements which are component parts of ores and other mineral-bearing compounds. This menstruum or solution consists of that liquid recovered as a by-product in gas and coke manufacturing plants and the like, being an aqueous product created in the destructive distillation of coal, oil shale or other hydrocarbons and known commercially as gas house liquor and also known as gas liquor.

The ores or other compounds of mineral elements to be treated when containing metallic sulphides are subjected to calcination wherein the sulphides contained are reducible to sulphates and oxides; all products treated to be first reduced by pulverizing to such degree of fineness to be best adaptable to the desired solubility.

The products, either sulphatized or oxidized, are subjected to immersion in the menstruum or solution producing a chemical alteration, resulting in certain of the mineral elements contained going into solution as a component part thereof, while the insoluble elements are recovered with or as a sludge or tailings on withdrawal of the then mineral bearing solution.

The recovery of the soluble mineral elements which are a part of the material treated by the menstruum and now contained therein in solution is obtained by distillation, that is, the mineral bearing solution is subjected to the action of live steam, air, preheated or otherwise, but with sufficient pressure to expel the chemical vapors formed, whereon the minerals contained in the solution are precipitated while the vapors expelled are condensed and recovered for reapplication or discharged.

After the solution has been degraded or despoiled by this distillation, wherein the support of the mineral elements in solution has been removed, the spent or degraded liquor is decanted or filtered from the precipitated compound and standardized for re-use in admixture with the recovered distillates or discharged as waste water.

The precipitates being removed from the filters or decanters in the resulting concentrated condition of those soluble elements and compounds, are subject to drying, cal cining or sublimation with a further recovery thereby of gaseous and vaporized chemical compounds useful and desired in recombination with the other distillates recovered to renew or standardize our menstruum for re-use.

The dried, calcined or sublimed precipitate, together with the tailings or sludge containing the nonsoluble elements and compounds, are the finished and valuable products of this process as described.

The development and demonstration of the process has been principally confined to the recovery of zinc from zinc bearing ore and mineral compounds containing zinc, wherein and whereby the mineral product used, after reduction by calcining to the proper solubility of the zinc contained, was immersed in the gas liquor menstruum, and agitated in the container until the soluble zinc had become a composite part of the menstruum being in solution therein, then separated from the sludge or tailings by filtration. The filtered zinc bearing solution then passed to a second agitation tank and was therein subjected to the action and pressure of live steam, causing the expulsion of the solvent ingredients in a gaseous or vaporized condition, which passing through a condensing coil was recovered in liquid form. In this distilling action, the zinc compound was precipitated in a finely disintegrated form and after drying and calcining to remove any solvent matter contained with the moisture, and which together is also condensed and recovered in the calcining operation, the resulting dried and highly concentrated zinc bearing compound is discharged as finished.

The highly solvent strength of the menstruum as proven in complete demonstration of practical and economical use, adapts its application in separation and recovery to all ores and other mineral bearing compounds containing a complexity of mineral elements wherein part are soluble and part insoluble, or in ores or other mineral bearing compounds containing one or more soluble elements of value to be removed from an insoluble gangue.

That group of metallic mineral elements which are soluble in the menstruum include zinc, copper, cadmium and various other or the less common elements, while the precious metals and lead, together with all metallic sulphides are therein insoluble and therefore recoverable as a tailing alone or with other non-soluble elements contained in the gangue of the mineral compound treated.

In further evidence and explanation of the utility and effectiveness of our process as applied to zinc ore in our proving or demonstration plant, we are prepared to submit samples of a calcined complex zinc bearing ore used therein, and the finished zinc bearing product obtained therefrom by the means and application of the gas liquor as the solvent menstruum as described, and we herewith insert the analysis of both products as follows:

| Calcined ore—zinc bearing ores used. | Zinc product—zinc bearing products recovered. |
|---|---|
| Insoluble............6.20% | .40%. |
| Fe..................4.40% | .10%. |
| Mn..................1.44% | Nil. |
| Zn..................50.40% | 79.40=98.85% ZnO. |
| Pb..................9.70% | .10%. |
| Cu..................1.39% | Nil. |
| S. (unoxidized)......88% S. total. | .07%. |
| SO$_3$................4.90% | |
| Au..................trace. | Nil. |
| Ag..................13.90 oz. per ton. | Nil. |

Our process provides a simple and practical hydrometallurgical method of separation and recovery in concentrated form, of the mineral elements contained in ores and other mineral bearing compounds, by application of this previously unknown solvent, consisting of raw gas house liquor, also known as gas liquor, and while we have described the manipulation as developed in use, we do not wish to be limited to such procedure as described, as changes and refinements in mechanical application may be found to be economic requirements.

Having described our invention, what we claim as new, and desire to secure by Letters Patent is:

1. The process of treating ores, mineral concentrates, etc., containing metallic oxides, carbonates, sulphates and sulphites, which consists in subjecting the said ores, mineral concentrates, etc., to the solvent action of gas house liquor (gas liquor), thereby causing the solution of such metals or metallic salts as are soluble in the said menstruum, separating the solution from the insoluble gangue or residue of the material treated, and recovering the values from the solution and from the residue.

2. The process of treating ores, mineral concentrates, etc., containing metallic oxides, carbonates, sulphates and sulphites, which consists in subjecting the said ores, mineral concentrates, etc., to the solvent action of gas house liquor (gas liquor), thereby causing the solution of such metals or metallic salts as are soluble in the said menstruum, separating the solution from the insoluble gangue or residue of the material treated, and recovering the values from the solution and from the residue, and also separating recovering and condensing the volatile matter, thereby regenerating the solvent.

3. The process of treating ores, mineral concentrates, etc., containing zinc values, which consists in subjecting the said ores, mineral concentrates, etc., to the solvent action of gas house liquor (gas liquor), thereby causing the solution of such metals or metallic salts as are soluble in the said menstruum, separating the solution from the insoluble gangue or residue of the material treated, and recovering the values from the solution and from the residue.

In testimony whereof we affix our signatures in presence of two witnesses.

WILLIAM F. GORDON.
EDWARD W. KEITH.

Witnesses:
G. SARGENT ELLIOTT,
MARGARET C. CLARK.